US008140987B2

(12) United States Patent  
Keren et al.

(10) Patent No.: US 8,140,987 B2  
(45) Date of Patent: Mar. 20, 2012

(54) GUI MODELING OF WEB SERVICES

(75) Inventors: Ido Keren, Hod Hasharon (IL); Rafi Elad, Herzelia (IL)

(73) Assignee: SAP AG, Walldorf (DE)

( * ) Notice: Subject to any disclaimer, the term of this patent is extended or adjusted under 35 U.S.C. 154(b) by 1464 days.

(21) Appl. No.: 11/321,392

(22) Filed: Dec. 29, 2005

(65) Prior Publication Data

US 2007/0157096 A1     Jul. 5, 2007

(51) Int. Cl.  
*G06F 3/048* (2006.01)
(52) U.S. Cl. ........ 715/763; 715/762; 715/761; 717/104; 717/105; 345/630
(58) Field of Classification Search .................... 715/763  
See application file for complete search history.

(56) References Cited

U.S. PATENT DOCUMENTS

| | | | |
|---|---|---|---|
| 6,678,668 B2 | 1/2004 | Fisher et al. | |
| 6,968,535 B2 | 11/2005 | Stelting et al. | |
| 2004/0017392 A1* | 1/2004 | Welch | 345/738 |
| 2004/0098732 A1* | 5/2004 | Clement et al. | 719/328 |
| 2004/0181596 A1 | 9/2004 | Sabiers et al. | |
| 2004/0207659 A1* | 10/2004 | Goodman et al. | 345/762 |
| 2004/0243685 A1 | 12/2004 | Sabiers et al. | |
| 2004/0243944 A1 | 12/2004 | Sabiers et al. | |
| 2005/0021689 A1 | 1/2005 | Marvin et al. | |
| 2005/0138634 A1* | 6/2005 | Luty et al. | 719/315 |
| 2005/0256882 A1* | 11/2005 | Able et al. | 707/10 |
| 2006/0150148 A1* | 7/2006 | Beckett et al. | 717/109 |
| 2007/0079282 A1* | 4/2007 | Nachnani et al. | 717/106 |

* cited by examiner

*Primary Examiner* — Doon Chow  
*Assistant Examiner* — Anil Kumar  
(74) *Attorney, Agent, or Firm* — Fish & Richardson P.C.

(57) ABSTRACT

The disclosure provides various embodiments of systems and methods for GUI modeling of web services. One method is a computer implemented method including presenting a plurality of web services to a user through a graphical user interface, with each web service comprising at least one web method. A first graphical model of a first web method of one of the plurality of web services is then presented based on a selection by the user. Next, a second graphical model of a second web method of one of the plurality of web services is then presented based on another selection by the user. The method further includes graphically correlating the first and second graphical models into a new graphical model of a new web service method.

28 Claims, 11 Drawing Sheets

GUI MODELING OF WEB SERVICES

TECHNICAL FIELD

This disclosure relates to computer systems and methods and, more particularly, to methods and systems for GUI modeling of web services.

BACKGROUND

Web services often help create compatibility and interoperability among various packaged and customized web applications in a standardized and vendor-neutral manner. Web services may be economical and beneficial when used in an enterprise-level business scenario that combines the functionality of multiple applications into easy-to-use enterprise services. Such a business scenario may require a services-oriented architectural approach. Enterprise services may expose the functionality and data of applications so that they can be accessed by any service user.

SUMMARY

The disclosure provides various embodiments of systems and methods for GUI modeling of web services. One method is a computer implemented method including presenting a plurality of web services to a user through a graphical user interface, with each web service comprising at least one web method. A first graphical model of a first web method of one of the plurality of web services is then presented based on a selection by the user. Next, a second graphical model of a second web method of one of the plurality of web services is then presented based on another selection by the user. The method further includes graphically correlating the first and second graphical models into a new graphical model of a new web service method.

DETAILED DESCRIPTION

Figure 1:
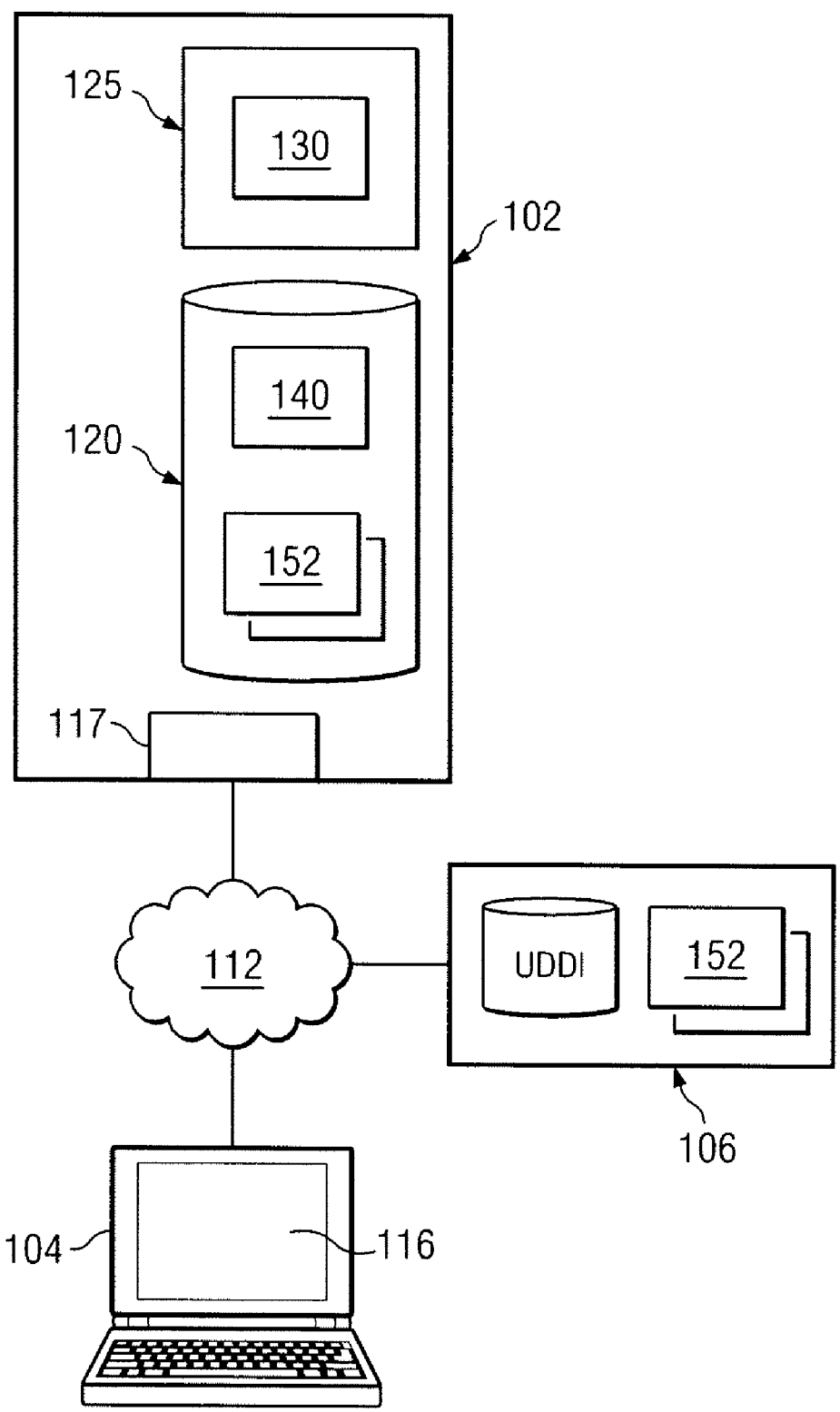
FIG. 1 illustrates an example system for managing web services in accordance with one embodiment of the present disclosure.

FIG. 1 illustrates an example system 100 for efficiently providing or managing dynamic files involving discovery of web services 152, which are often described using Web Services Description Language (WSDL). For example, web services 152 may be discovered and stored in an extensible file (140) with hierarchical information associated with the plurality of web services 152. This file may have a low footprint on the respective server, while requiring little maintenance. For example, system 100 may use these discovered web services 152 to offer role-based interfaces that allow employees or other users to easily or efficiently work together. Using these identified web services 152, system 100 may allow the user to compose model-based business applications or web services in a flexible way and without much, or any, manual coding. More specifically, such application development would be based on the model-driven paradigm, with as little coding as possible and paired with high level application robustness and flexibility with regard to front ends. This model-driven approach helps visual, pattern-based programming that still offers complete control for the power developer, while also providing ease of web services generation and consumption. For example, the user may create pattern-based or freestyle user interfaces using simple drag-and-drop services and then define the data flow between them. Because this development may be model-driven, the user can typically compose an application without having to write much, if any, code. Once the model is deployed, system 100 may translate the model into the required code for the application or web service.

System 100 is typically a distributed client/server system that spans one or more networks such as 112. As described above, rather than being delivered as packaged software, system 100 may represent a hosted solution, often for an enterprise or other small business, that may scale cost-effectively and help drive faster adoption. In this case, portions of the hosted solution may be developed by a first entity, while other components are developed by a second entity. Moreover, the processes or activities of the hosted solution may be distributed amongst these entities and their respective components. In another example, system 100 may implement a component-based architecture and strong platform that helps engage service providers to develop targeted solutions for sub-verticals. This implementation may emphasize features that helps benefit businesses that sell via online stores, thereby leveraging strategic relationships to bring the product to market. In such embodiments, data may be communicated or stored in an encrypted format such as, for example, using the standard TNG encryption algorithm. This encrypted communication may be between the user and the host or amongst various components of the host. But system 100 may be in a dedicated enterprise environment—across a local area network or subnet—or any other suitable environment without departing from the scope of this disclosure.

Turning to the illustrated embodiment, system 100 includes or is communicably coupled with server 102, one or more clients 104, one or more web service providers 106, at least some of which communicate across network 112. Server 102 comprises an electronic computing device operable to receive, transmit, process and store data associated with system 100. For example, server 102 may be a Java 2 Platform, Enterprise Edition (J2EE)-compliant application server that includes Java technologies such as Enterprise JavaBeans (EJB), J2EE Connector Architecture (JCA), Java Messaging Service (JMS), Java Naming and Directory Interface (JNDI), and Java Database Connectivity (JDBC). But, more generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server.

Server 102 may also be communicably coupled, directly or indirectly, with a plurality of web service providers 106. As described above, these providers 106 may be local or remote to server 102 so long as they have one or more web services 152 deployed and operable to be discovered. Web service 152 is operable to receive, decode, and respond to client requests. In general, a "web service" is a web-based application or software that interacts with other web applications via network 112 using open standards, i.e., publicly available standards. More specifically, each web service 152 may be a self-contained, modularized, executable entity (or a component exposed as a web service, such as Java components, remote function call (RFC) modules, and IDocs) that can be published, searched for, and accessed across network 112. For example, Simple Object Access Protocol (SOAP) and XML are current communication standards used in most web services. SOAP is a messaging protocol based on XML for accessing and promoting services on the World Wide Web. SOAP messages may be independent of operating systems used by system 100 and may be transmitted using a variety of Internet protocols, including Simple Mail Transfer Protocol (SMTP), Multipurpose Internet Mail Extensions (MIME), Hyper Text Transfer Protocol (HTTP), or any other suitable protocol. Though, web services 152 employing SOAP do not provide web pages over network 112 but instead share business logic, data, and processes through a programmatic interface across network 112. Regardless of the format, these web services 152 often include one or more web methods that perform a particular set of functionality.

Web services 152 are often deployed herein using a web service deployment file 140 to users via an HTTP handler. This handler often uses a virtual URL that allows other users or clients 104 to access the particular web service 152. But, of course, providers 106 may use any other suitable method for web service deployment. For example, the web services 152 may be provided through a framework used to describe web services interfaces in a Universal Description, Discovery, and Integration (UDDI) repository. Business process management coordinates the activities of web services provided by business partners to manage processes across applications. In addition, application 130 may support the WS-I Basic Profile, WSI-I Sample Applications, and WS-Security activities. In another example, providers 106 may each deploy one or more web services 152 using any suitable technique. For example, provider 106 may deploy an Internet Information Services (IIS)-based Web Service and generate a virtual root (vroot) on the particular web server running IIS. Then, to configure web service 152, provider 106 may create a configuration file for the particular service 152 and place it in the vroot along with the other files. This configuration file may provide various features such as compilation, security, globalization, and HTTP handler mappings.

Returning to server 102, it often includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes local web services 152 and a web service discovery file 140. But memory 120 may also include any other appropriate data such as VPN applications or services, firewall policies, a security or access log, print or other reporting files, HTML files or templates, data classes or object interfaces, unillustrated software applications or sub-systems, and others.

Illustrated web service discovery file 140 is any hierarchical file that includes parameters, pointers, variables, algorithms, instructions, rules, files, links, or other data for easily providing information associated with or other logical structure of web services 152. Discovery file 140 is typically an extensible file with a low footprint on server 102. In some embodiments, discovery file 140 may be formatted, stored, or defined as various data structures in eXtensible Markup Language (XML) documents, text files, Virtual Storage Access Method (VSAM) files, flat files, Btrieve files, comma-separated-value (CSV) files, internal variables, one or more libraries, or any other format capable of storing or presenting web services 152 and their respective web methods in a hierarchical form, such as a tree with multiple nodes. In the tree structure, discovery file 140 may include two types of nodes: disco nodes and services nodes. In this case, disco nodes may contain references to a virtual URL, while service nodes include a reference to the actual web service WSDL. For example, discovery file 140 may present information in a format similar to the following tree example:

```
<discovery xmlns:xsd="http://www.w3.org/2001/XMLSchema"
    xmlns:xsi="http://www.w3.org/2001/XMLSchema-instance"
    xmlns="http://schemas.xmlsoap.org/disco/">
    <discoveryRef name="Customer Relationship Management"
ref="http://iltlvh122/B1WS/disco.aspx?id=1" />
    <discoveryRef name="Foundation Layer"
ref="http://iltlvh122/B1WS/disco.aspx?id=4" />
    <discoveryRef name="Customer Invoicing"
ref="http://iltlvh122/B1WS/disco.aspx?id=7" />
    <discoveryRef name="Utils"
ref="http://iltlvh122/B1WS/disco.aspx?id=9" />
</discovery>
```

This example structure represents the root of the discovery tree. Under the root, there are four nodes, each node with a name and a reference to the nodal identifier. Continuing this example, a view of the first node in the discovery tree may be as follows:

```
<discovery xmlns:xsd="http://www.w3.org/2001/XMLSchema"
    xmlns:xsi="http://www.w3.org/2001/XMLSchema-instance"
    xmlns="http://schemas.xmlsoap.org/disco/">
    <discoveryRef name="Sales Order Processing"
ref="http://iltlvh122/B1WS/disco.aspx?id=2" />
    <discoveryRef name="Customer Quote Processing"
ref="http://iltlvh122/B1WS/disco.aspx?id=3" />
    </discovery>
```

Then, if the user or developer drills down on the view of a leaf (or node) that holds a reference to the actual web service WSDL document:

```
<discovery    xmlns:xsd="http://www.w3.org/2001/XMLSchema"
    xmlns:xsi="http://www.w3.org/2001/XMLSchema-instance"
    xmlns="http://schemas.xmlsoap.org/disco/">
    <contractRef
ref="http://iltlvh122/B1WS/SalesOrderService.asmx?wsdl"
    xmlns="http://schemas.xmlsoap.org/disco/scl/" />
    <soap address=
"http://iltlvh122/B1WS/SalesOrderService.asmx"
    xmlns:q1=This is a view of the first node in the discovery
tree.http://www.xyz.com/B1WS/B1Light"
    binding="q1:SalesOrderServiceSoap">
```

-continued

```
    xmlns="http://schemas.xmlsoap.org/disco/soap/" />
</discovery>
```

Of course, the forgoing example is for illustration purposes only. In short, discovery file 140 may comprise one table or file or a plurality of tables or files stored on one computer or across a plurality of computers in any appropriate format as described above. Indeed, some or all of discovery file 140 may be local or remote without departing from the scope of this disclosure and store any type of appropriate data.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes application 130.

At a high level, the application 130 is operable to receive and/or process requests 150 from users and present at least a subset of the results to the particular user via an interface. More specifically, application 130 is any application, program, module, process, or other software that may allow for management and development of web services 152. For example, application 130 may be a developer studio tool or other development environment providing centralized administration, access to objects stored in the Java infrastructure, synchronization of development on source and archive levels, and/or synchronization of development teams across repository boundaries, thereby potentially allowing for a customer modification concept. In this case, application 130 may enable business analysts to create content that combines analytical and transactional steps using a business intelligence (BI) kit. This kit may help the developer access data—including online analytical processing (OLAP) and relational data—via BI Java connectors. In another example, application 130 may be a web service framework supporting some or all of the following functions for consuming web services 152: i) full integration of client programming and configuration; ii) web service retrieval using, for example, an integrated UDDI browsing tool; and/or iii) web client service development based on standardized WSDL descriptions. Using the example WSDL file as input, application 130 may generate a web service client proxy that allows the application developer to focus on business functionality, while technical aspects (including creating valid SOAP messages) are automatically handled by the proxy implementation. In yet another example, application 130 may instead deploy web services 152 by providing the web service hierarchical file 140 to users via an HTTP handler. This handler often uses a virtual URL that allows other users or clients 104 to access the particular web service 152.

Regardless of the particular implementation, "software" may include software, firmware, wired or programmed hardware, or any combination thereof as appropriate. Indeed, application 130 may be written or described in any appropriate computer language including C, C++, Java, J#, Visual Basic, assembler, Perl, any suitable version of 4GL, as well as others. It will be understood that while application 130 is illustrated in FIG. 1 as a single module that implements the various features and functionality through various objects, methods, or other processes, it may instead include a number of sub-modules, third party services respectively, libraries, and such. For example, application 130 may be a composite application with any number of portions that may be implemented as Enterprise Java Beans (EJBs) or the design-time components may have the ability to generate run-time implementations into different platforms, such as J2EE, ABAP (Advanced Business Application Programming) objects, or Microsoft's NET. Further, while illustrated as internal to server 102, one or more processes associated with application 130 may be stored, referenced, or executed remotely. For example, a portion of application 130 may be a web service that is remotely called, while another portion of application 130 may be an interface object bundled for processing at remote client 104. Moreover, application 130 may be a child or sub-module of another software module or enterprise application (not illustrated) without departing from the scope of this disclosure. Server 102 may also include interface 117 for communicating with other computer systems, such as clients 104, over network 112 in a client-server or other distributed environment. In certain embodiments, server 102 receives data from internal or external senders through interface 117 for storage in memory 120 and/or processing by processor 125. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals. Interface 117 may allow communications across network 112 via a virtual private network (VPN), SSH (Secure Shell) tunnel, or other secure network connection.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. In certain embodiments, network 112 may be a secure network associated with the enterprise and certain local or remote clients 104.

Client 104 is any computing device operable to connect or communicate with server 102 or network 112 using any communication link. At a high level, each client 104 includes or executes at least GUI 116 and comprises an electronic computing device operable to receive, transmit, process and store any appropriate data associated with system 100. It will be understood that there may be any number of clients 104 communicably coupled to server 102. Further, "client 104," "developer," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. As used in this disclosure, client 104 is intended to encompass a personal computer, touch screen terminal, workstation, network computer, kiosk, wireless data port, smart phone, personal data assistant (PDA), one or more processors within these or other devices, or any other suitable processing device. For example, client 104 may be a PDA operable to wirelessly connect with external or unsecured network. In another example, client 104 may comprise a laptop that includes an input device, such as a keypad, touch screen, mouse, or other device that can accept information, and an output device that conveys information associated with the operation of server 102 or clients 104, including digital data, visual information, or GUI 116. Both the input device and output device may include fixed or removable storage media such as a magnetic computer disk, CD-ROM, or other suitable media to both receive input from and provide output to users of clients 104 through the display, namely the client portion of GUI or application interface 116.

GUI 116 comprises a graphical user interface operable to allow the user of client 104 to interface with at least a portion of system 100 for any suitable purpose, such as viewing application or other transaction data. Generally, GUI 116 provides the particular user with an efficient and user-friendly presentation of data provided by or communicated within system 100. As shown in later figures, GUI 116 may comprise a plurality of customizable frames or views having interactive fields, pull-down lists, and buttons operated by the user. For example, GUI 116 is operable to display certain presentation elements 140 in a user-friendly form based on what the user, or developer, is trying to accomplish. For example, GUI 116 may present an editor operable to manage and/or search deployment file 140. In another example, GUI 116 may be the front end of a development suite capable of allowing the user to graphically model web methods in order to generate new web methods, such as illustrated in FIG. 5. GUI 116 may also present a plurality of portals or dashboards. For example, GUI 116 may display a portal that allows users to view, create, and manage historical and real-time reports including role-based reporting and such. Of course, reports may be in any appropriate output format including PDF, HTML, and printable text. GUI 116 is often configurable, supporting a combination of tables and graphs (bar, line, pie, status dials, etc.), and is able to build real-time dashboards. It should be understood that the term graphical user interface may be used in the singular or in the plural to describe one or more graphical user interfaces and each of the displays of a particular graphical user interface. Indeed, reference to GUI 116 may indicate a reference to the front-end or a component of application 130, as well as the particular interface accessible via client 104, as appropriate, without departing from the scope of this disclosure. Therefore, GUI 116 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112.

Regardless of the particular hardware or software architecture used, application 130 is generally capable of allowing multiple users from one or more entities to develop, deploy, discover, or otherwise manage web services 152 to, for example, execute various business processes and techniques. The following descriptions of flowcharts focus on the operation of application 130, or one of its components or submodules, in performing one of the respective methods or processes. But system 100 contemplates using any appropriate combination and arrangement of logical elements implementing some or all of the described functionality.

Figure 2:
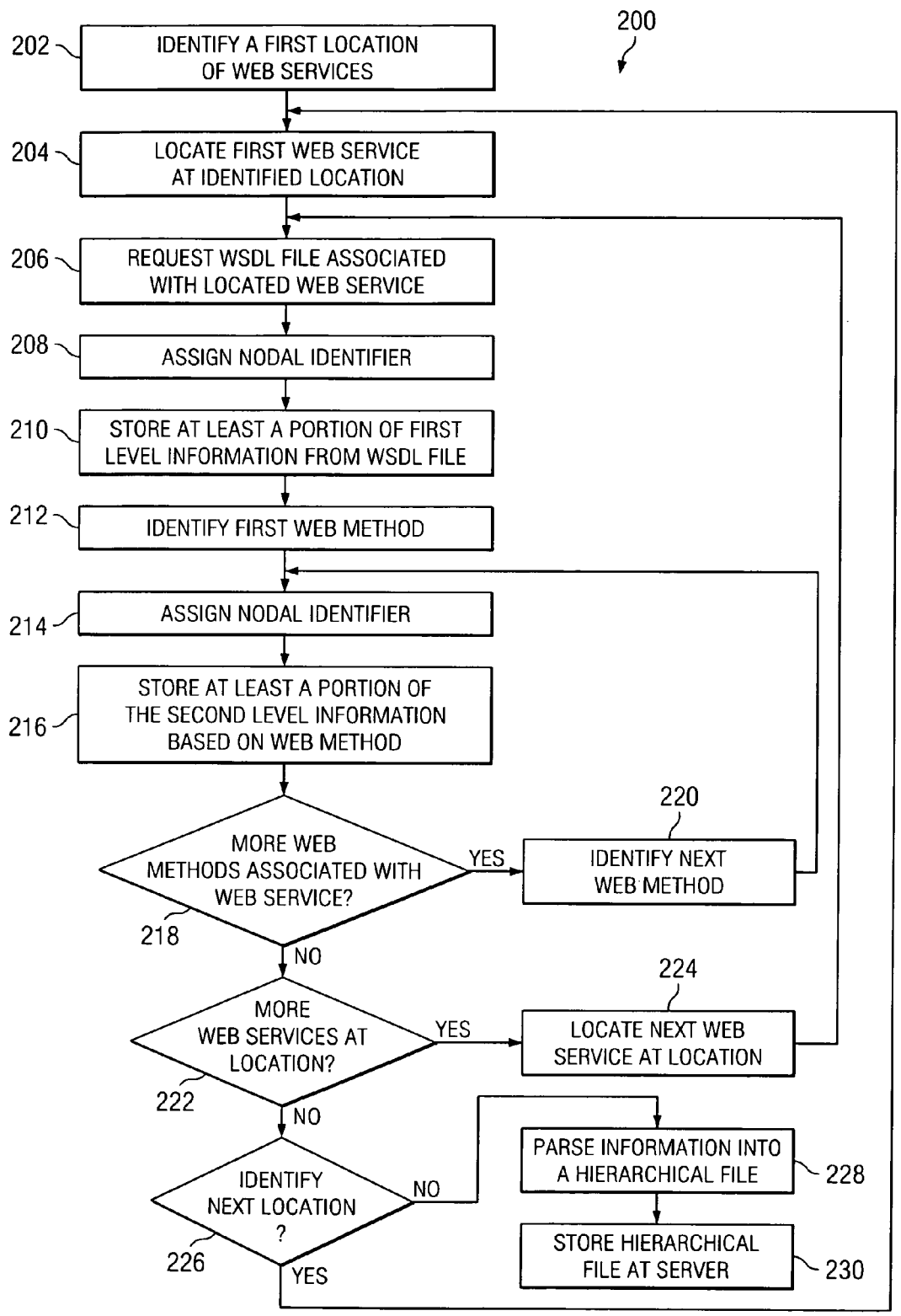
FIG. 2 is a flowchart illustrating an example method for generating a dynamic discovery file based on discovered web services.

FIG. 2 is a flowchart illustrating an example method 200 for dynamically generating a discovery file based on discovered web services 152. Generally, method 200 describes discovering one or more local or remote web services 152, determining its place in a hierarchy of other discovered web services 152 (if any), and storing such a hierarchy in discovery file 140. Illustrated method 200 begins at step 202, where application 130 identifies a first location, whether local or remote, of a first web service 152. This identification may occur automatically using any suitable technique or based on a request, selection, or other indication by a user. For example, application 130 may locate the first web service 152 using a second, remote discovery file located at a web service provider 106. In another example, the user may search a particular website for various web services. In yet another example, the web service locations may be discovered using UDDI or static disco files. Next, at step 204, application 130 locates a first web service 152 at the particular location. As with the location, this location can be based on automatic and/manual processes. The WSDL associated with the web service 152 is then retrieved or scanned at step 206.

Once this information is determined, application 130 then attempts to determine the particular web service's 152 place in a hierarchy. For example, application 130 may determine that other web services 152 from this location had previously been processed. Moreover, a name and a nodal identifier are assigned to the located web service 152 based on this hierarchy at step 208. For example, if there are six previous first level web services, then the current web service 152 may be assigned a nodal identifier of "7." At least a portion of the determined information is stored in an appropriate data structure (such as a tag) in discovery file 140 at step 210. Next, application 130 identifies the first web method comprising part of the web service 152 at step 212. At step 214, the hierarchical location of this second level information is then assigned a nodal identifier. At least part of this information is then stored in the appropriate location or data structure in file 140 at step 216. At decisional step 218, it is determined if there are more desired web methods in the particular web service 152. If there are, the next web method is identified at step 220 and processing returns to step 214. Once the desired or other appropriate web methods in the web service 152 have been suitably processed, then application 130 determines if there are more (automatically and/or manually) indicated web services 152 at the location. If there are more web services 152, then the next one is located at step 224 and processing returns to step 206. As shown by step 226, the aforementioned processing may occur for any number of locations. Once the information involving the web services 152 has been collected and identified, then the information is parsed and processed as appropriate to ensure compatibility with the previous web services. For example, application 130 may extract the logical location of the identified web services 152 to help ensure that duplicates are not stored in file 140. Once processing and other verification is complete, the discovery file 140 is stored at, for example, server 102. This file 140 may then be viewed and/or modified using an editor compatible with such types of files. Typically, the editor includes a search form or frame that allows the user to find a logical location, web service 152, a web method, or particular node using the appropriate search criteria.

Figure 3:
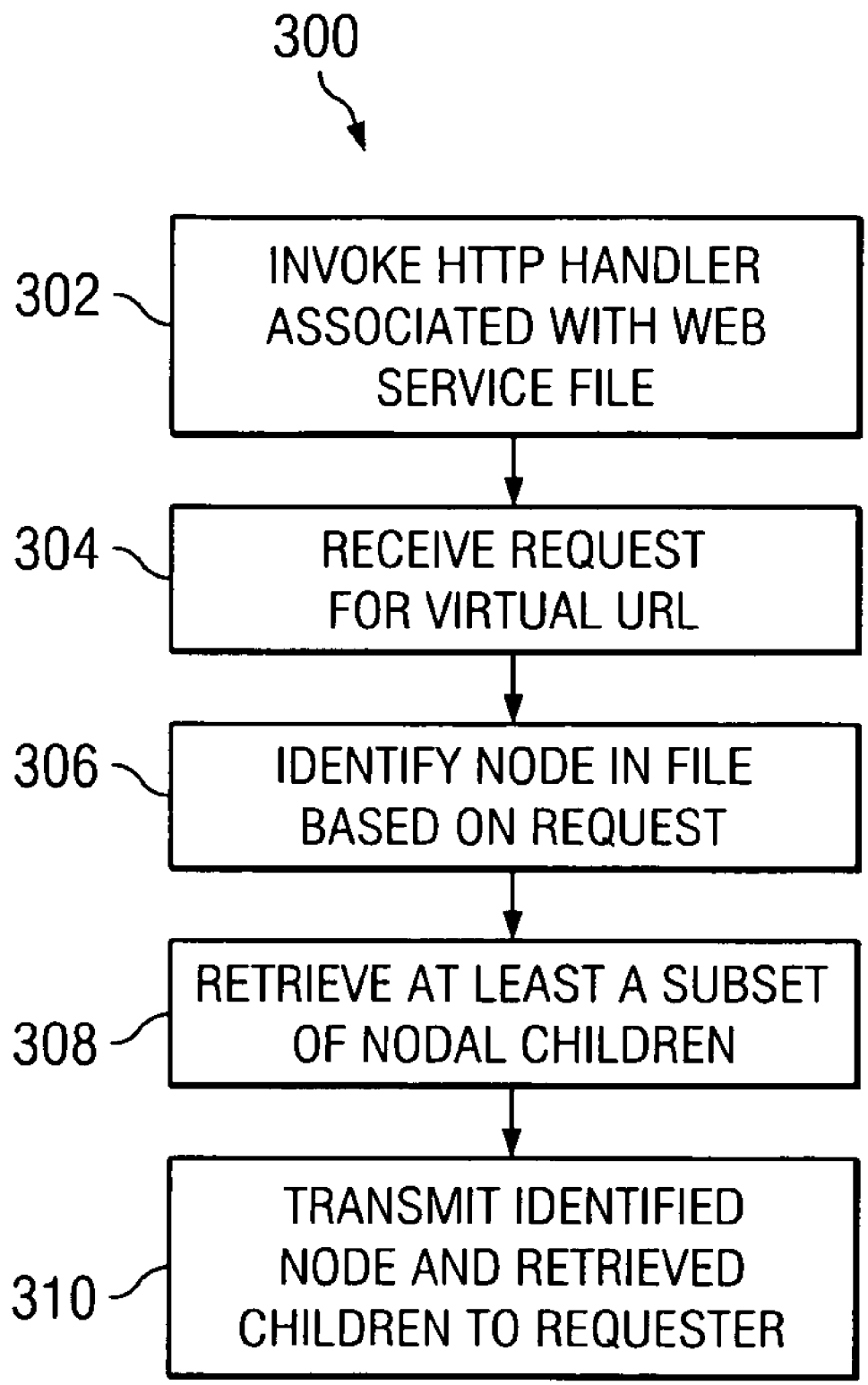
FIG. 3 is a flowchart illustrating an example method involving deploying a plurality of web services.

Once the discovery 140 is at least partially created (even if empty of information associated with web services 152), this file 140 may be presented to one or more clients 104. In some cases, file 140 may be available to the general public, a consuming public, or authenticated customers via the Internet. FIG. 3 is a flowchart illustrating an example method 300 involving deploying a plurality of web services. Method 300 begins at step 302, where application 130 invokes an HTTP handler that is associated with the discovery file 140. Once the handler is deployed, then application 130 monitors incoming requests involving the particular handler at step 304. During this processing, application 130 may—in certain circumstance—only allow secured requests, such as via a VPN or SSH, or may authenticate the requestor as appropriate. For example, server 102 may present two files 104: a first file 140 for the general public and a second file 140 for an authenticated subset of the public. Next, at step 306, application 130 identifies the desired node based on the request. For example, the request may specifically identify the node using the nodal identifier, using the name, or any other information to select one or more web services 152. At step 308, application 130 selects at least a subset of the children nodes deriving from the requested parent node. These collected nodes are then transmitted to the requestor at step 310.

Figure 4:
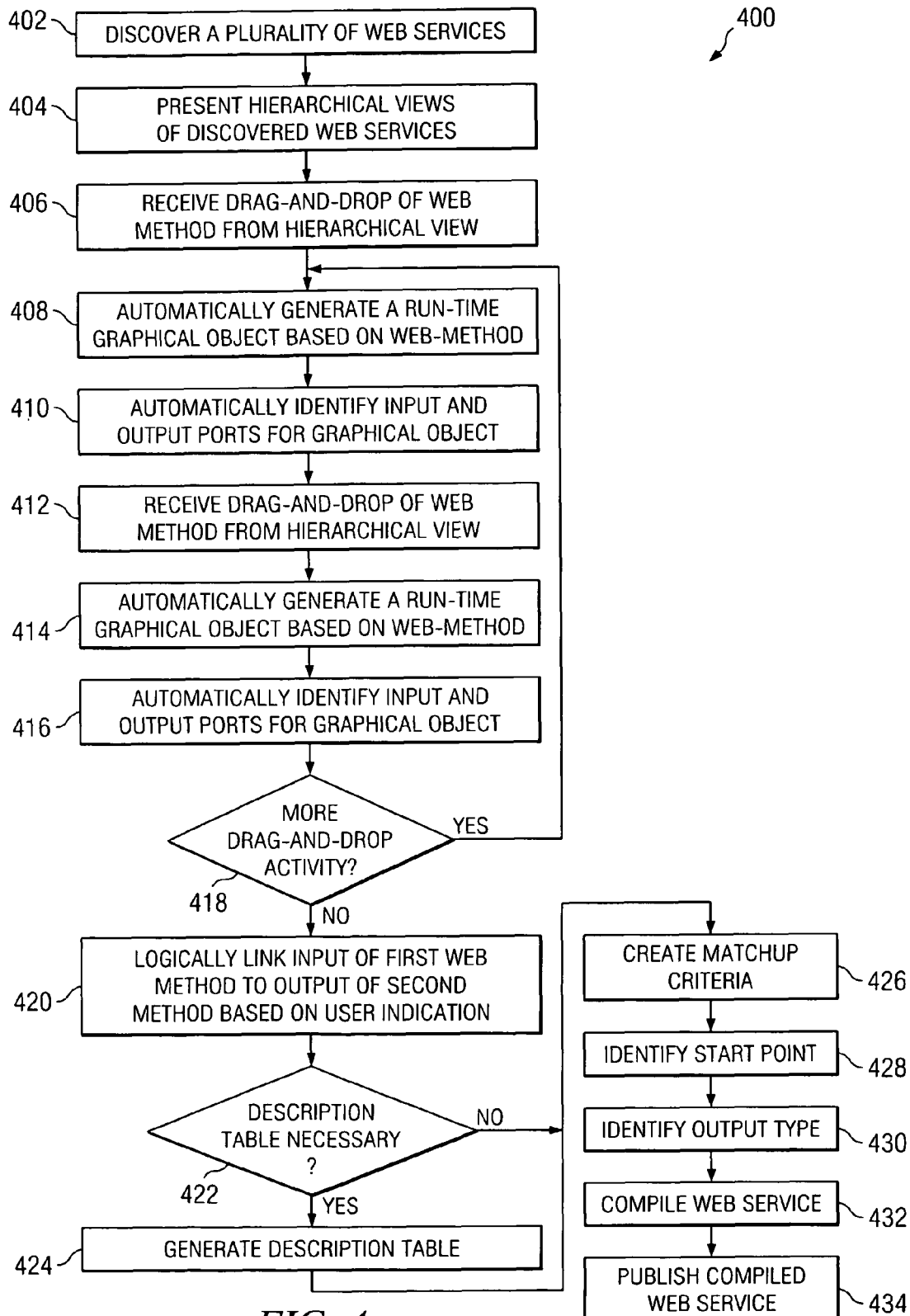
FIG. 4 is a flowchart illustrating an example method for graphical modeling of web services using the system of FIG. 1.
Figure 5A:
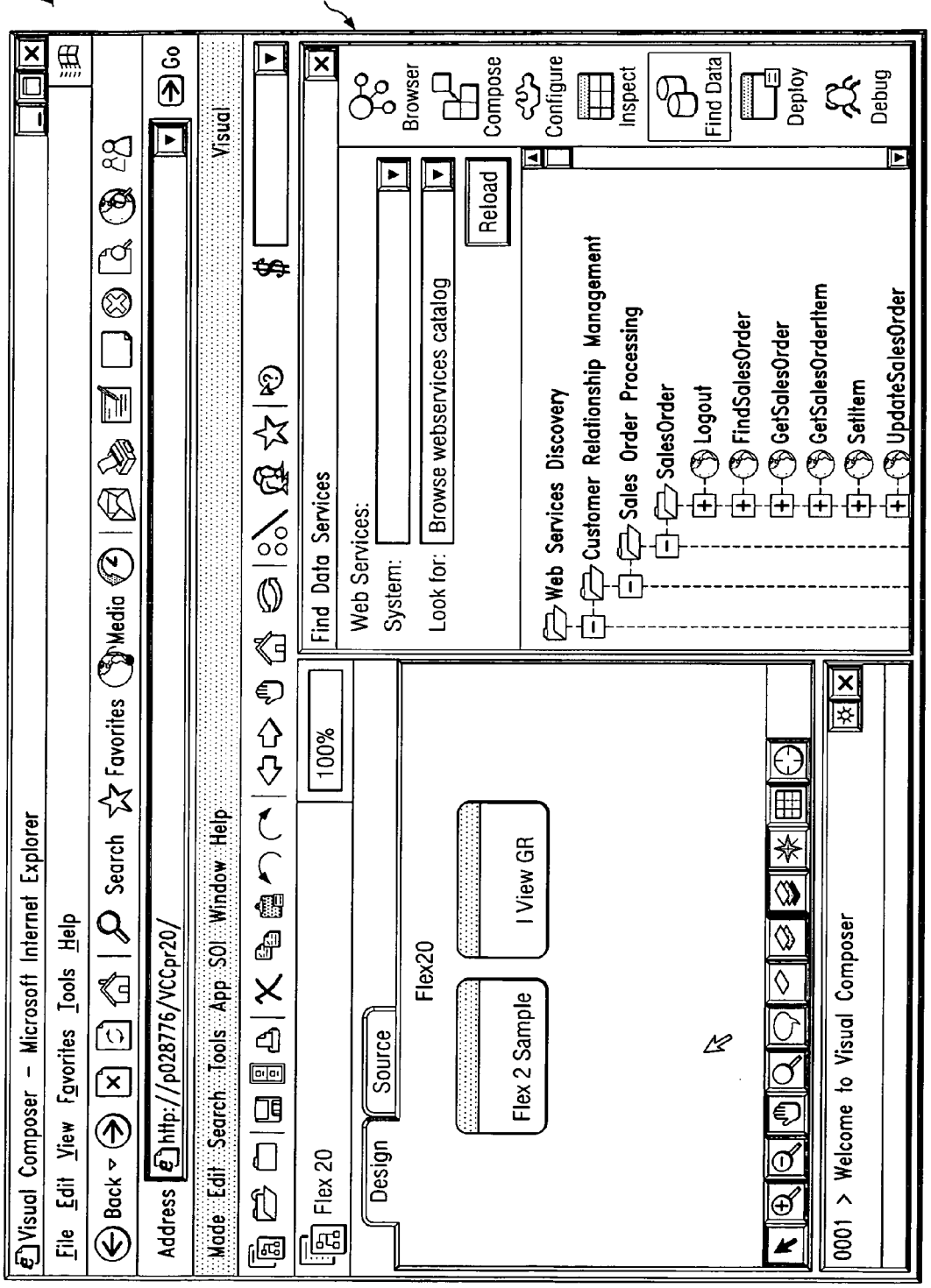
FIGS. 5A-G illustrate example graphical user interfaces (GUIs) for graphical modeling web services as implemented by the application described in FIG. 1.

FIG. 4 is a flowchart illustrating an example method 400 for graphical modeling of web services 152 using the system of FIG. 1. Generally, method 400 describes application 130 collecting web services 152 and allowing a user to develop new web services 152, or web methods, by graphically modeling at least some portion of the collected web services 152. For example, illustrated method 400 begins at step 402, where one or more web services 152 are discovered. This discovery may include (singly or in combination) loading a static disco file, utilizing UDDI techniques, as well as loading discovery file 140 described above. At least a portion of these web services 152 is presented to the developer via GUI 116 at step 404. The portion may be selected based on user role, security, or other criteria to help make development of new web services 152, or web methods, more efficient and secure. More specifically, these discovered, collected, or otherwise identified web services 152 may be presented in a tree view, as illustrated at FIG. 5A.

Figure 5B:
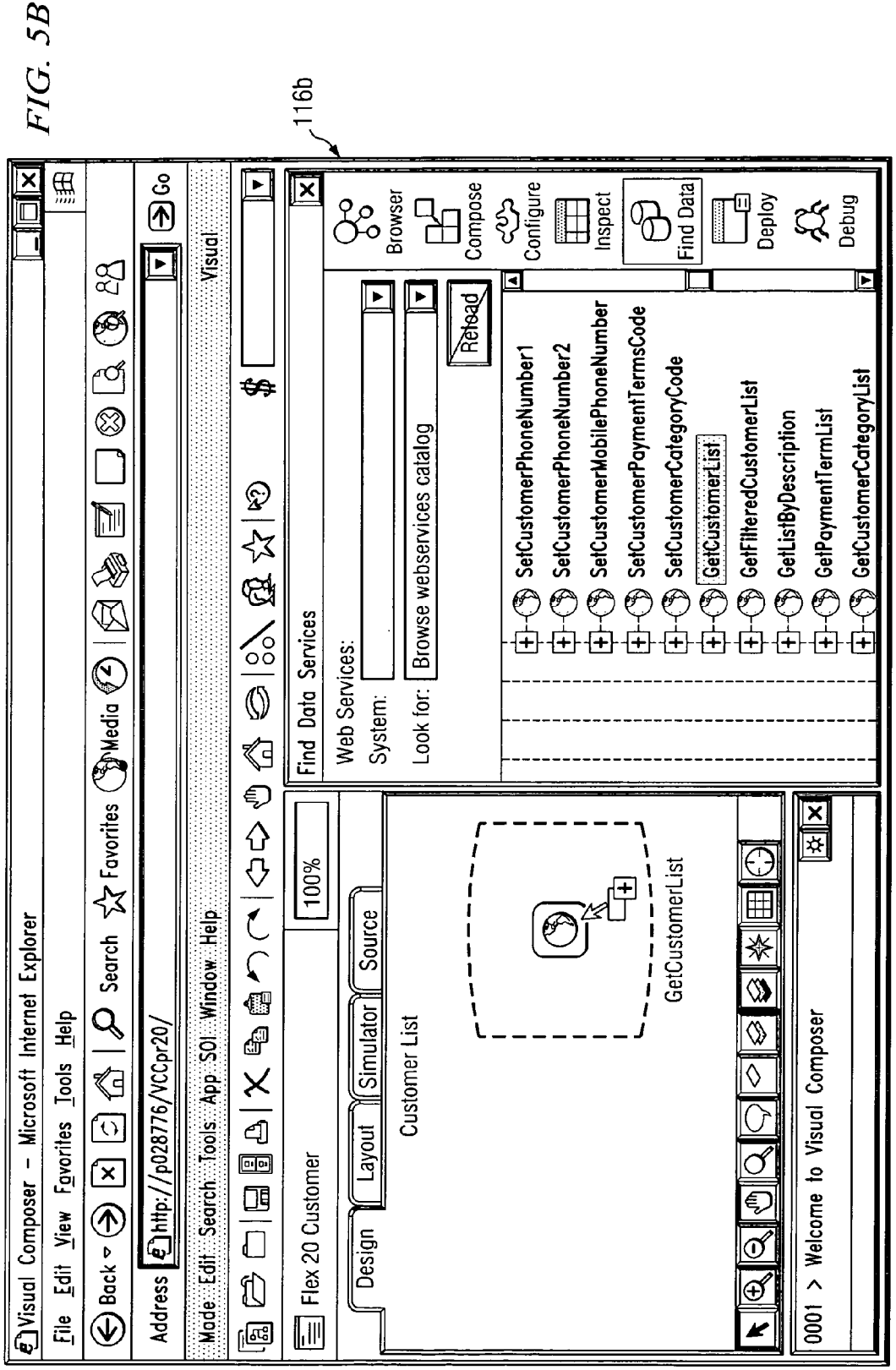
Figure 5C:
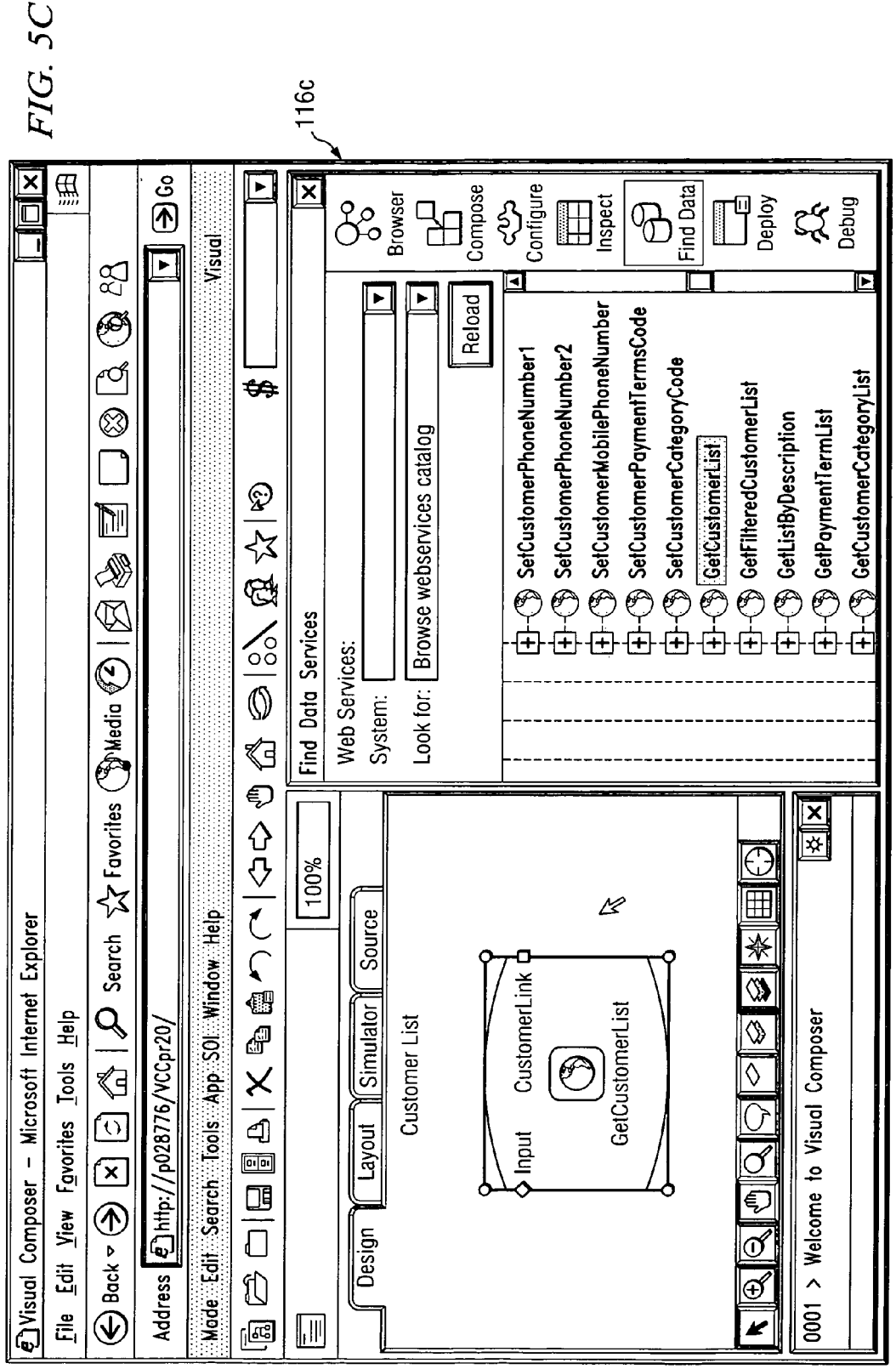

Once at least some of the web services 152 are displayed to the developer, he may drag-and-drop any node onto the graphical modeling portion of the interface at step 406, perhaps using a mouse or other input device. In the case of selecting a web service 152, application may gather all of the children nodes (associated with component web methods) for placement in the modeling grid. For example, FIG. 5B shows the developer selecting, then "dropping" the "GetCustomerList" web method on the modeling grid. Based on this drop, application 130 retrieves information (whether local or remote) associated with this particular web structure and instantiates a visual modeling object at step 408. Of course, while described in terms of "drag-and-drop," application 130 may allow and developer 130 may utilize any suitable or similar functionality to help develop a graphical model of the web service 152 or component web method. Next, at step 410, application 130 may automatically identify input ports and/or output ports of the particular web method as shown in FIG. 5C. These ports generally represent the input of the function and the function result. In some cases, application 130 may also determine one or more input ports and one or more output ports of the web method based on a graphical selection or other indication by the developer. For example purposes, method 400 further illustrates application 130 processing a drag-and-drop of a second web method at steps 412-416, which may be similarly described as steps 406-410 with respect to a second web method. Indeed, the developer may continue to drag-and-drop web methods as appropriate as shown by decisional step 418. It will be understood that this second web method (as well as others) may be associated with the same web service 152 as the first web method or may be relatively unrelated to the first web method.

Figure 5D:
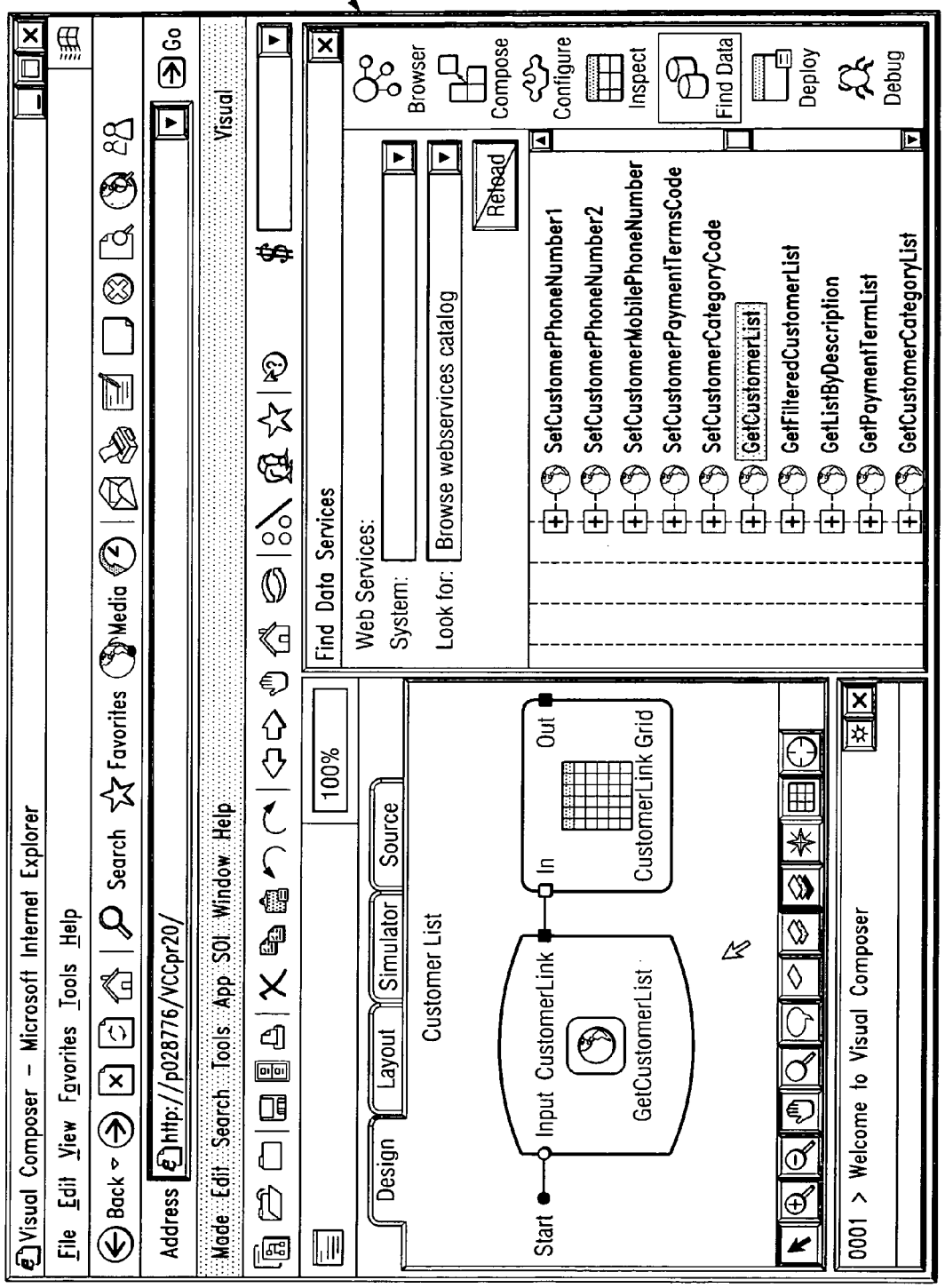
Figure 5E:
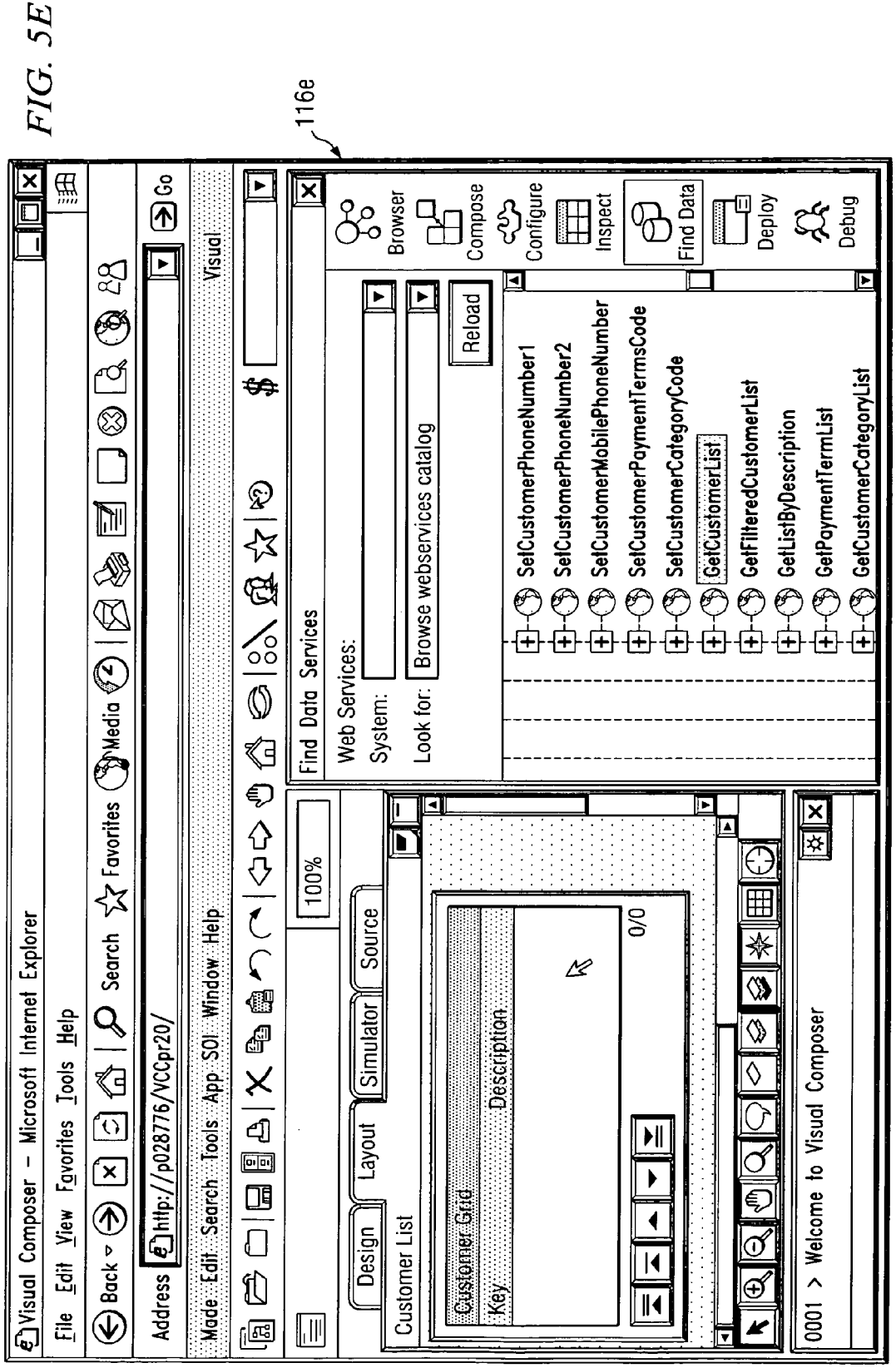
Figure 5F:
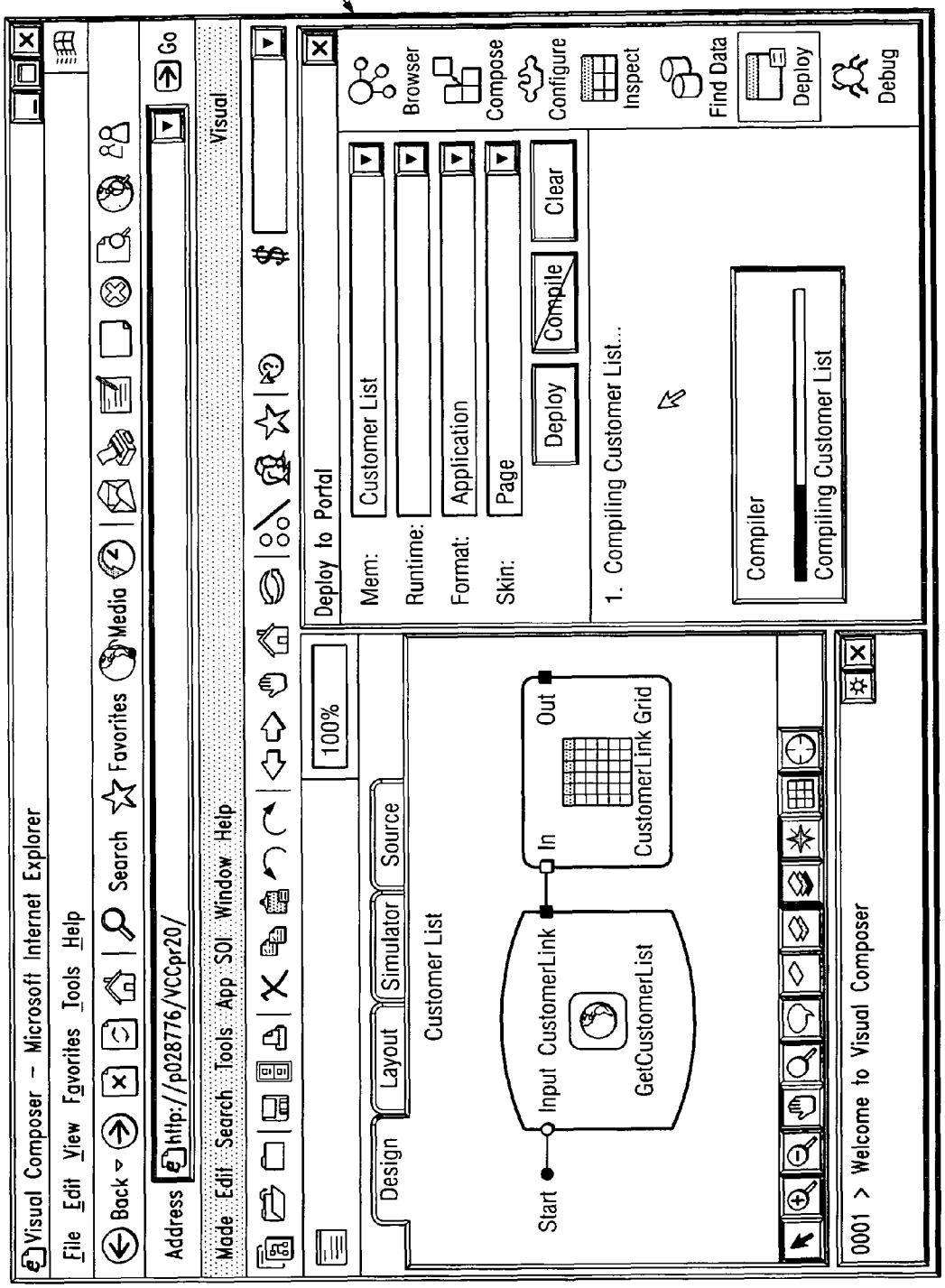
Figure 5G:
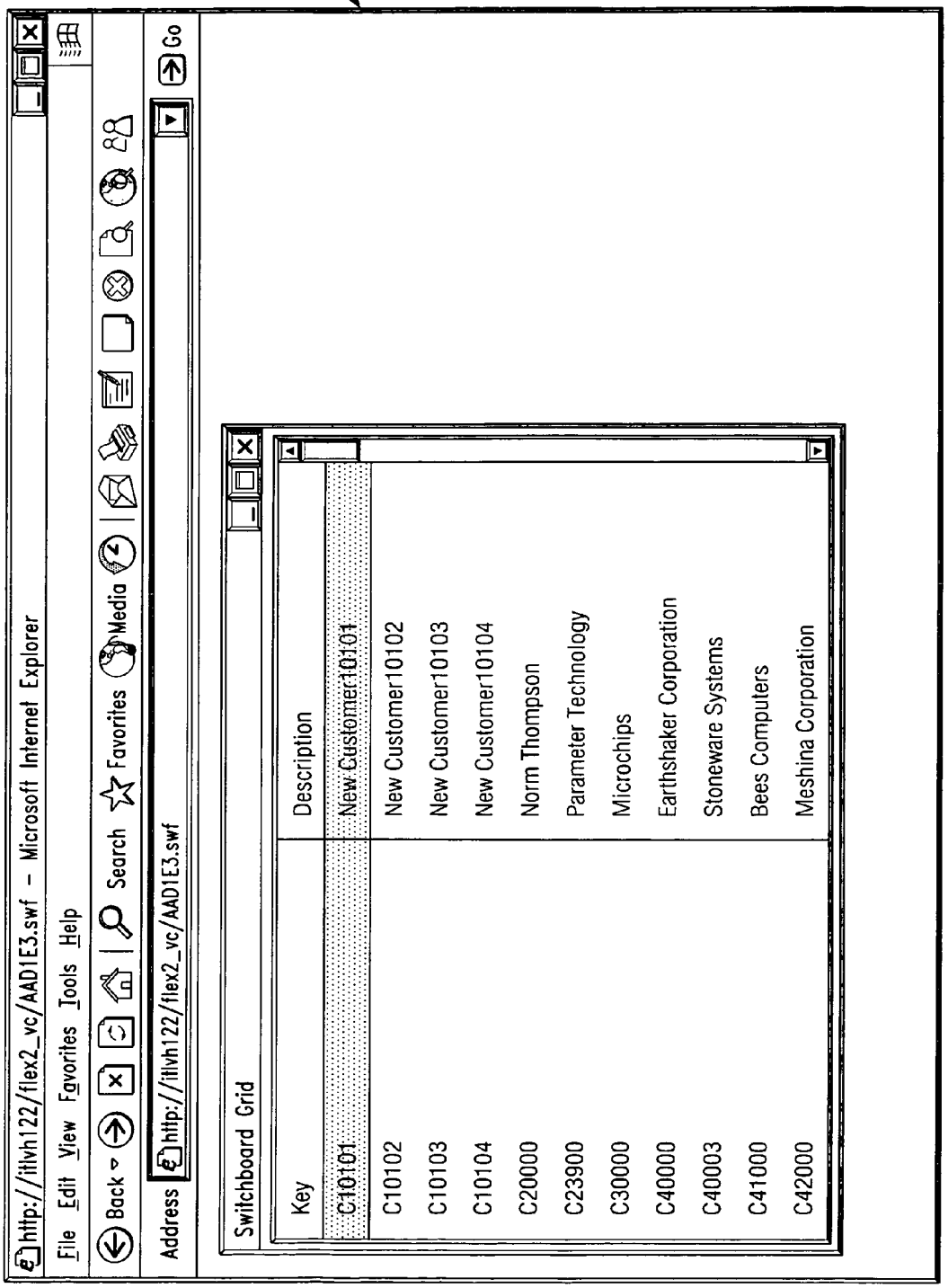

Once the web methods have been dropped onto the modeling grid and the inputs and outputs identified, then application 130 may logically relate these modeling objects to create a single set of functionality at step 420. For example, the developer may select an output port of one web method and drag an indicator over to the input port of the other web method. Part of this relation processing may also include the creation of a description table (as illustrated by decisional step 422 and step 424) or the creation of matchup criteria at step 426. The developer may then select, point-and-click, or otherwise indicate the starting point of the newly developed graphical model at step 428, which is shown at FIG. 5D. Next, at step 428, application 130 may automatically determine or receive a request from the developer for the particular output type of the new web method. These output types may be any suitable output for a web method including, for example, a grid, a presentation or other GUI element, a multimedia object, or a hyperlink. As shown by FIG. 5E, the developer may also edit or modify the layout of the output as appropriate. After the developer has graphically created the new web method, often without writing any code, he may request or execute a compilation process via application 130 at step 430 as shown by FIG. 5F. This new web method can then be deployed or published using any deployment technique including UDDI, static disco, or via discovery file 140. In this case of file 140, application 130 may automatically determine the new method's hierarchical location in the tree and automatically populate the structure with information, name, and a nodal identifier for storage in file 140. This deployment might allow any or authenticated users to invoke the new web service 152 or web method, perhaps using the same or another instance of application 130, to generate or request run-time in the predetermined output form as shown in FIG. 5G.

The preceding flowchart and accompanying description illustrate exemplary methods 200-400. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in these flowcharts may take place simultaneously and/or in different orders than as shown. Moreover, system 100 may use methods with additional steps, fewer steps, and/or different steps, so long as the methods remain appropriate.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A computer implemented method for developing a new web service method comprising:

presenting a plurality of web services to a user through a graphical user interface, each web service comprising at least one web method;

presenting a first graphical model of a first web method of one of the plurality of web services based on a selection by the user;

presenting a second graphical model of a second web method of one of the plurality of web services based on another selection by the user; and graphically correlating the first and second graphical models into a new graphical model of a new web service method.

2. The method of claim 1, the first web method and the second web method associated with the same web service.

3. The method of claim 1, the plurality of web services presented in a hierarchical fashion.

4. The method of claim 3, further comprising identifying at least a subset of the plurality of web services based on information describing the subset of web services stored in an extensible file to enable the hierarchy.

5. The method of claim 1, a portion of the plurality of web services comprising third party web services.

6. The method of claim 1, each graphical model comprising a visual modeling object.

7. The method of claim 1, further comprising allowing the user to graphically identify at least one input port and at least one output port of the first graphical model.

8. The method of claim 7, further comprising allowing the user to graphically identify at least one input port and at least one output port of the second graphical model.

9. The method of claim 8, further comprising allowing the user to identify the input port of the first graphical model as a start point and an output format associated with the output port of the second graphical model.

10. The method of claim 9, further comprising allowing the user to match-up one of the output ports of the first graphical model with one of the input ports of the second graphical model.

11. The method of claim 9, the output format comprising one of the following:
   a grid;
   a presentation element;
   a multimedia object; or
   a hyperlink.

12. The method of claim 8, further comprising allowing the user to identify the input port of the second graphical model as a start point and an output format associated with the output port of the first graphical model.

13. The method of claim 1, each graphical model associated with source code and the method further comprising:
   compiling the new graphical model into the new web service method; and
   publishing the new web service method.

14. The method of claim 1, the new web service method associated with a new web service.

15. Software for developing a new web service method, the software comprising computer readable instructions embodied on tangible media and operable to:

present a plurality of web services to a user through a graphical user interface, each web service comprising at least one web method;

present a first graphical model of a first web method of one of the plurality of web services based on a selection by the user;

present a second graphical model of a second web method of one of the plurality of web services based on another selection by the user; and graphically correlate the first and second graphical models into a new graphical model of a new web service method.

16. The software of claim 15, the first web method and the second web method associated with the same web service.

17. The software of claim 15, the plurality of web services presented in a hierarchical fashion.

18. The software of claim 17, further operable to identify at least a subset of the plurality of web services based on information describing the subset of web services stored in an extensible file to enable the hierarchy.

19. The software of claim 15, a portion of the plurality of web services comprising third party web services.

20. The software of claim 15, each graphical model comprising a visual modeling object.

21. The software of claim 15, further operable to allow the user to graphically identify at least one input port and at least one output port of the first graphical model.

22. The software of claim 21, further operable to allow the user to graphically identify at least one input port and at least one output port of the second graphical model.

23. The software of claim 22, further operable to allow the user to identify the input port of the first graphical model as a start point and an output format associated with the output port of the second graphical model.

24. The software of claim 23, further operable to allow the user to match-up one of the output ports of the first graphical model with one of the input ports of the second graphical model.

25. The software of claim 23, the output format comprising one of the following:
   a grid;
   a presentation element;
   a multimedia object; or
   a hyperlink.

26. The software of claim 22, further operable to allow the user to identify the input port of the second graphical model as a start point and an output format associated with the output port of the first graphical model.

27. The software of claim 15, each graphical model associated with source code and the software further operable to:
   compile the new graphical model into the new web service method; and
   publish the new web service method.

28. The software of claim 15, the new web service method associated with a new web service.

* * * * *